(12) United States Patent
Larmour-Ship et al.

(10) Patent No.: US 11,041,227 B2
(45) Date of Patent: Jun. 22, 2021

(54) PROCESS FOR RECOVERING GOLD FROM ORES

(71) Applicants: BROMINE COMPOUNDS LTD., Beer Sheva (IL); TENOVA ADVANCED TECHNOLOGIES LTD, Yokneam (IL)

(72) Inventors: Keren Larmour-Ship, Mitzpe Netofa (IL); Tal Fabian, Kiryat Tivon (IL); Alan Miller, Haifa (IL); Sharon Krumbein Rubin, Kibbutz Naan (IL); Elizabeta Shandalov, Omer (IL); Mira Bergstein Freiberg, Omer (IL)

(73) Assignees: BROMINE COMPOUNDS LTD, Beer Sheva (IL); TENOVA ADVANCED TECHNOLOGIES LTD, Yokneam (IL)

( * ) Notice: Subject to any disclaimer, the term of this patent is extended or adjusted under 35 U.S.C. 154(b) by 324 days.

(21) Appl. No.: 16/302,204

(22) PCT Filed: May 17, 2017

(86) PCT No.: PCT/IL2017/050553
§ 371 (c)(1),
(2) Date: Nov. 16, 2018

(87) PCT Pub. No.: WO2017/199254
PCT Pub. Date: Nov. 23, 2017

(65) Prior Publication Data
US 2019/0292628 A1    Sep. 26, 2019

Related U.S. Application Data

(60) Provisional application No. 62/338,556, filed on May 19, 2016.

(51) Int. Cl.
*C22B 3/00* (2006.01)
*C22B 3/38* (2006.01)
(Continued)

(52) U.S. Cl.
CPC .......... *C22B 11/04* (2013.01); *C22B 3/0005* (2013.01); *C22B 3/0043* (2013.01); *C22B 3/10* (2013.01);
(Continued)

(58) Field of Classification Search
CPC ....... C22B 11/00; C22B 11/04; C22B 3/0005; C22B 3/0043; C22B 3/10; C22B 3/42;
(Continued)

(56) References Cited

U.S. PATENT DOCUMENTS 4,684,404 A * 8/1987 Kalocsai ................ C22B 11/04
423/38
4,997,532 A * 3/1991 Flax ....................... C25C 1/20
205/568
(Continued)

FOREIGN PATENT DOCUMENTS

EA    013929    8/2010
EP    0 476 862    3/1992
(Continued)

OTHER PUBLICATIONS

Office Action issued in RU Appln. No. 2018140560 dated Jun. 25, 2020 (w/ partial translation).
(Continued)

*Primary Examiner* — Anthony J Zimmer
*Assistant Examiner* — Dean Mazzola
(74) *Attorney, Agent, or Firm* — Nixon & Vanderhye P.C.

(57) ABSTRACT

A process for recovering gold from a gold-containing raw material, comprising leaching the gold-containing material with an aqueous solution comprising elemental bromine and
(Continued)

Figure 1:
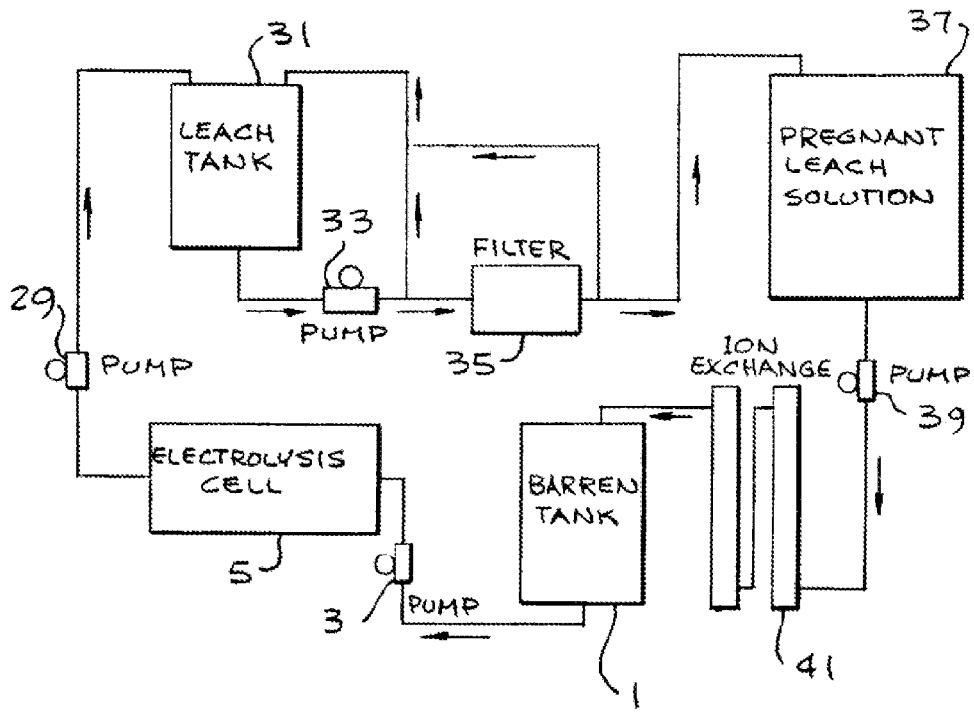

bromide source to form a pregnant leach solution with the gold dissolved therein; separating said pregnant leach solution from the gold-depleted raw material, removing elemental bromine from said pregnant leach solution, extracting the gold from the pregnant leach solution in an acidic environment into an organic extractant, to form a gold-loaded extract and bromide-containing raffinate, stripping the extract with an alkaline aqueous solution to form a gold-bearing aqueous solution, generating gold ($Au^0$) and treating bromide-containing stream(s) to produce recyclable elemental bromine.

17 Claims, 3 Drawing Sheets

(51) Int. Cl.
  *C22B 3/26* (2006.01)
  *C22B 3/44* (2006.01)
  *C22B 3/10* (2006.01)
  *C25B 1/24* (2021.01)
  *C22B 11/00* (2006.01)

(52) U.S. Cl.
  CPC .................. *C22B 3/44* (2013.01); *C25B 1/24* (2013.01); *Y02P 10/20* (2015.11)

(58) Field of Classification Search
  CPC ... C22B 3/44; Y02P 10/20; C25B 1/24; C25C 1/20; C01B 9/04; C01B 7/09; C01G 7/00
  See application file for complete search history.

(56) References Cited

U.S. PATENT DOCUMENTS

| | | | |
|---|---|---|---|
| 5,607,619 A | | 3/1997 | Dadgar et al. |
| 5,939,034 A | * | 8/1999 | Virnig .................. C07C 279/16 423/24 |

FOREIGN PATENT DOCUMENTS

| | | | | |
|---|---|---|---|---|
| EP | 0476862 A1 | * | 3/1992 | ............... C25C 1/20 |
| JP | 2013-163868 | | 8/2013 | |
| RU | 2 094 502 | | 10/1997 | |
| RU | 2 353 679 | | 4/2009 | |
| WO | WO 2004/087998 | | 10/2004 | |

OTHER PUBLICATIONS

Melashvili, et al., "Study of Gold Leaching with Bromine and Bromide and the Influence of Sulphide Minerals on this Reaction" *COM 2014—Conference of Metallurgists Proceedings*, Oct. 1, 2014, XP002770304.

Sadeghi et al., "A new approach for monitoring and controlling the extraction of gold by tri-butyl phosphate from chloride media" *Minerals Engineering* 85, pp. 34-37 (2016).

Tocher et al., "The Extraction of Acids by Basic Organic Solvents. IV. Tributyl Phosphate and Trioctyl Phosphine Oxide-$HAuCl_4$ and $HAuBr_4^1$" *Journal of Physical Chemistry* 68 (9), pp. 368-374 (1964).

International Search Report issued in PCT/IL2017/050553 dated Sep. 12, 2017.

Written Opinion of the International Searching Authority issued in PCT/IL2017/050553 dated Sep. 12, 2017.

* cited by examiner (Prior Art; EP 476862)

PROCESS FOR RECOVERING GOLD FROM ORES

This application is the U.S. national phase of International Application No. PCT/IL2017/050553 filed May 17, 2017 which designated the U.S. and claims priority to 62/338,556 filed May 19, 2016, the entire contents of each of which are hereby incorporated by reference.

Leaching of gold ores with cyanide lixiviant has been traditionally used by the gold mining industry. However, alternative reagents have been considered as cyanide replacements, including halide/halogen-based systems. Elemental bromine ($Br_2$) may be used on account of its ability to oxidize gold, forming the $AuBr_4^-$ ion in an aqueous solution.

For example, it has been shown in U.S. Pat. No. 4,684,404 that metallic gold can be dissolved in an aqueous solution in the presence of sodium bromide and elemental bromine, e.g., in an aqueous reagent comprising 1.0% v/v $Br_2$ and 1.0% v/v sodium bromide. It was also pointed out in that patent that the gold/bromine complexes formed in the aqueous solution could be extracted with the aid of organic solvents such as methyl isobutyl ketone (MIBK), di-isobutyl ketone (DIBK) and ethyl ether.

Figure 2:
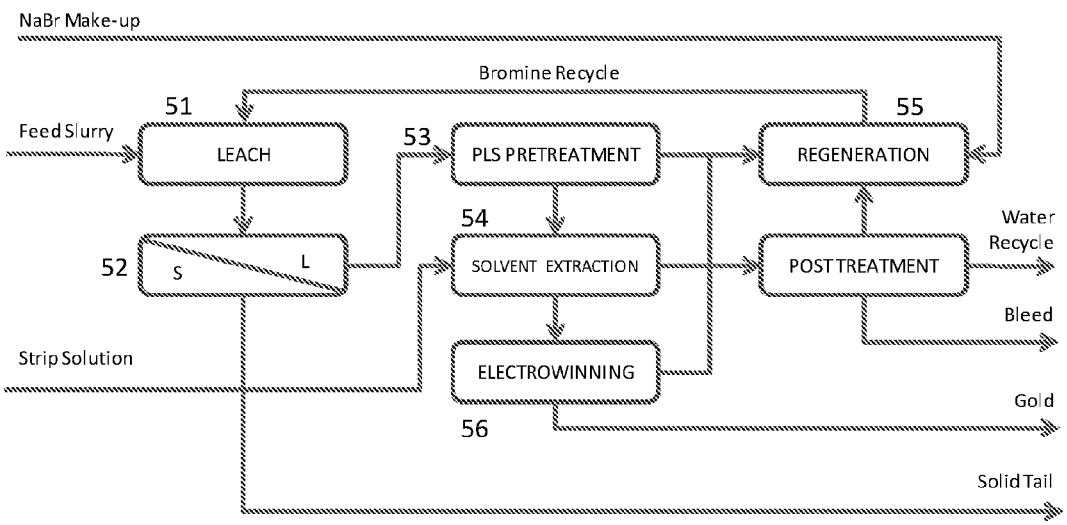

Bromine-based gold recovery technology may gain commercial acceptance if an effective closed loop method is developed to enable the recycling of bromides into elemental bromine utilized in the leaching stage. A process design with desired recyclability was illustrated in EP 476862. FIG. 2 of EP 476862, which is reproduced below as FIG. 1, illustrates a process for recovery of gold consisting of three major steps. In the first step (31) gold ore is leached with bromine/bromide aqueous solution. The slurry is separated by filtration (35) into a solid and an aqueous phase which contains the $AuBr_4^-$ ion, that is, the pregnant leach solution which is collected in a tank (37). In the second step (41), gold is removed from the pregnant leach solution by passing the solution through a column loaded with anion exchange resin. A depleted bromide solution is formed (1); its bromide content is adjusted and in the third step (5), the concentrated bromide solution passes through one or more electrolytic cells whereby bromide is oxidized to elemental bromine, to produce an aqueous bromine solution that is recycled and used in the leaching step.

It should be noted that other techniques for gold removal from the pregnant leach solution are mentioned in EP 476862, including solvent extraction. It is known that gold could be extracted with the aid of phosphorous compounds such as tri-butyl phosphate and tri-octyl phosphine [Tocher et al., Journal of Physical Chemistry 68(9) p. 368-374 (1964); Sadeghi et al., Minerals Engineering 85 p. 34-37 (2016)]. However, the incorporation of solvent extraction into gold recovery process that is based on bromine lixiviant remains a challenge.

Experimental work conducted in support of this invention shows that the extractability of gold from $Br_2/Br^-$ pregnant leach solution into some organic solvents, in particular phosphorous esters, can be greatly improved as a result of pH adjustment of the $Br_2/Br^-$ pregnant leach solution within the acidic range. In turn, the gold can be effectively stripped from the organic extract with the aid of an alkaline solution, more preferably a strongly alkaline solution, to form gold-bearing aqueous solution from which the gold could be recovered in a metal form. Furthermore, minimizing the bromine content of the pregnant leach solution prior to the extraction step has been shown to result in increased stripping efficiency. Thus, leaching gold ores with $Br_2/Br^-$ aqueous reagent, extracting gold from the pregnant leach solution into a suitable organic solution, stripping the gold from the organic extract solution and regenerating the bromine lixiviant fit together neatly to give a gold recovery process showing a percentage of recovery exceeding 85% and even 90% combined with high recyclability.

The present invention is therefore primarily directed to a process for recovering gold from a gold-containing raw material, e.g., a gold ore as explained below, comprising leaching the gold-containing material with an aqueous solution comprising elemental bromine and bromide source to form to a pregnant leach solution having the gold dissolved therein; separating said pregnant leach solution from the gold-depleted raw material, removing elemental bromine from said pregnant leach solution, extracting the gold from the pregnant leach solution in an acidic environment into an organic extractant, which is preferably selected from the group consisting of organophosphorous and amine compounds, to form an extract and bromide-containing raffinate, stripping the extract with an alkaline aqueous solution to form a gold-bearing aqueous solution, generating gold ($Au^0$) and treating bromide-containing streams to produce recyclable elemental bromine.

Reference is now made to FIG. 2, which provides a flowchart of the process. The numerals indicated below correspond to the process steps shown in FIG. 2.

For the gold leaching step (51), the leach solution used is an aqueous solution of elemental bromine and a bromide source, that is, elemental bromine and one or more water-soluble bromide salts, such as alkali or alkaline earth bromide, e.g., sodium bromide or calcium bromide, are combined together in water to form the leach solution, generally in a sealed vessel to prevent escape of bromine vapors. Bromine may be supplied to the leach reactor in the form of a recycled stream, as described below. The concentrations of the bromine and bromide in the leach solution are each independently in the range from 0.1 to 10% by weight, for example, from 0.3 to 3% by weight. However, solutions with surprisingly low $Br_2$ and $Br^-$ content, that is, with less than 1.0% by weight $Br_2$ and less than 1.0% by weight bromide have shown to be powerful lixiviants; for example, solutions comprising from 0.4% to 0.7% by weight $Br_2$ and from 0.4% to 0.7% bromide may be used. The two components ($Br_2$/$Br^-$) are generally present in equal weight concentrations. The leach solution is sometimes named herein "the $Br_2/Br^-$ reagent".

The solid, gold-bearing raw material is added to a suitable reaction vessel which was previously charged with the leach solution (though a reverse order of addition may also be applied). The raw material may be crushed or milled to reduce particle size, to facilitate the leaching.

The weight ratio [leach solution:solid raw material] in the reaction vessel is preferably not less than 1:2, more preferably not less than 1:1, for example, from 5:1 to 1:1, e.g., between 3:1 and 1:1. The leaching of the gold from the ore is advanced under stirring, with stirring velocity sufficient to effectively suspend the slurry (e.g., on laboratory scale, not less than 100 rpm, for example, from 200 to 500 rpm, more specifically from 250 to 350 rpm, typically at ambient temperature (it is understood that ambient in slurry after grinding mill, or roasting can be up to 40-42 deg). Under these conditions, the Oxidation Reduction Potential (ORP) measured in the reaction vessel is typically around 900 mV, for example, in the range from 800 mV to 950 mV. The ORP value is fairly stable throughout the leaching reaction, indicating the presence of active bromine species in the reaction mixture, and may therefore be measured periodically or constantly to track the progress of the process. For example, if the ORP value measured at the beginning of the process is below the range set forth above, then this result may signal that Au recovery would not reach the desired goal of >80%.

Leach time may vary from about two minutes to about twenty four hours. However, experimental results reported below indicate that on a laboratory scale, leaching of gold from the ore is successfully accomplished after a fairly short period of time, say, less than 30 minutes, e.g. from ten to twenty minutes. Longer leach times may not result in increased percentage of gold recovery, so on industrial scale production, it may be beneficial to determine the preferred leach time and terminate the reaction accordingly.

The $Br_2/Br^-$ reagent may be used to recover gold from a range of raw materials, such as bullion, gold-bearing scrap material, electronic scrap material, ores, flotation and gravity concentrates, leach residues, tailings, such as flotation tailings, and refractory gold ores (which may have, or may not have, been pretreated by pressure oxidation or roasting); Free-milling gold ores/concentrates and pretreated refractory gold concentrates including sulfidic and oxide ores. Hereinafter, the term "ore" is used for the sake of simplicity. Specific types of ores to be used by the process include oxidized ore (namely, sulfide ore or concentrate that has been oxidized by pressure oxidation or roasting) and oxide ore.

In general, the leaching takes place at a pH lower than 8. As shown by the experimental results reported below, gold leaching from various ore samples advances effectively at the natural pH of the slurried material in the leach solution, without any "pH correction". It should be noted that due to the acidity of the leach solution, the pH measured upon adding the ore to the leach solution is lower than that measured when the ore is slurried in water. The pH drop depends on the type of the ore, as tabulated below for some illustrative ores:

TABLE A

| Ore | Oxidized ore* | Oxide Ore | Sulfide Floatation tailing | Free milling sulfide ore |
|---|---|---|---|---|
| pH (in water) | 7.8 | 8.6 | 8.1 | 6.7 |
| pH (in 5 g/l $Br^-$ + 5 g/l $Br_2$ leach solution) | ~7.5 | 7 | 6.8 | 2.0 |

*sulfide ore or concentrate that has been oxidized by pressure oxidation or roasting, sometimes also named roaster calcine.

The process of the invention is especially suitable for leaching gold from ores which generate a near-neutral or slightly alkaline pH when added to water, say, pH in the range from 6.5 to 9. On addition of such ores to the leach solution, the natural pH of the slurried material would be below 8.0, e.g., from 6.0 to 8.0, and the leaching may be brought to completion in this pH range, preferably at pH from 7 to 8. However, very good results are also obtained for ores producing acidic pH.

Having completed the leaching reaction, the aqueous solution is separated from the solid, for example, by filtration or any other solid/liquid separation method (52), to give the pregnant leach solution (PLS) having the gold dissolved therein.

It has been found that washing of the separated solid, gold-depleted raw material (e.g., of the filter cake obtained) with the aqueous $Br_2/Br^-$ reagent, having $Br_2$ and $Br^-$ concentrations corresponding to those outlined above in respect to a fresh leach solution, followed by separation of the solid from the aqueous washing liquid (by filtration, centrifugation or decantation) generates an aqueous solution (e.g., a filtrate) with some gold constituent. The washing/separation cycle may be repeated, e.g., two or more times, with solid:wash liquid weight ratio from 2:1 to 1:5, preferably 1:1 to 1:5. The aqueous solution(s) collected after the washing/separation cycle(s) is/are combined with the PLS. As shown by the experimental results below, this leads to a significant increase in the gold recovery percentage. The leaching reaction followed by washing of the separated solid, as described above, forms a separate aspect of the invention.

Next, the pregnant leach solution is subjected to solvent extraction. However, two useful intermediate steps are preferably incorporated into the process prior to solvent extraction. In the flowchart shown in FIG. 2, these intermediates steps are collectively indicated by numeral (53); the corresponding box in the drawing is named "PLS pretreatment".

Figure 3:
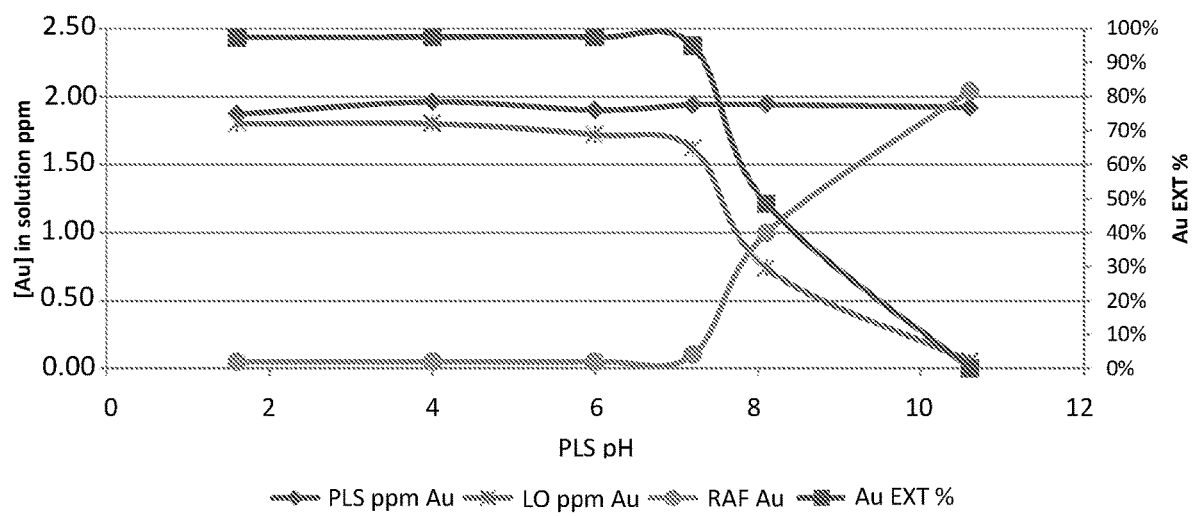

The first step consists of lowering the pH of the PLS to the acidic range, e.g., below 6.0. This may be accomplished by adding a mineral acid such as hydrobromic acid (HBr), although other acids such as hydrochloric (HCl) or sulfuric ($H_2SO_4$) may also be used. It should be understood that this step is optional, because many ores generate acidic PLS, and therefore, no "pH correction" is needed. However, as mentioned above, some ores, when leached by $Br_2/Br^-$ aqueous reagent, produce a PLS with a slightly basic pH or near-neutral pH (6.5<pH, for example, 6.5<pH<8.0). Although favorable for leaching gold from the ore, this near-neutral, slightly basic pH environment does not commensurate with the pH range needed to allow an effective extraction of the gold from the PLS into organic extractants. In particular, it was found that in order to successfully extract the gold from the PLS using an organophosphorous extractant, it is important to adjust the pH of the PLS to somewhat below pH 6. The pH dependence of the extractability of gold into an organic extractant (tri n-butyl phosphate) is illustrated in the graph of FIG. 3. The curves were plotted on the basis of a typical experiment where the organic medium (tri n-butyl phosphate dissolved in an aliphatic kerosene diluent, 25% (v/v)) and PLS were combined at O:A (organic:aqueous) ratio of 1:1. The phases were shaken vigorously for 3 minutes in a separating funnel and allowed to separate before sampling. In the graph, the abscissa is the pH, the left ordinate is the concentration of gold (in the PLS—marked by rhombuses; in the raffinate—marked by circles; in the gold-loaded extract—marked by X) and the right ordinate is the calculated percentage of gold extraction (the corresponding curve is marked by squares). It is seen that the percentage of gold extraction drops sharply when the pH of the PLS is not shifted to acidic range.

The second step consists of removal of elemental bromine from the PLS. It has been found that the presence of elemental bromine in the PLS may later interfere with the stripping of gold from the organic extract. However, when bromine is removed from the PLS prior to solvent extraction to produce an essentially bromine-free PLS, say, PLS with bromine concentration of not more than 0.25 g/liter, and preferably not more than 0.15 g/liter, then the efficiency of gold recovery during the stripping of the organic extract greatly improves, with gold stripping percentage exceeding 90% and even 95%. Furthermore, cross-current stripping experiments reported below indicate that the transfer of gold from the organic extract to the stripping medium to form gold-bearing aqueous solution for further processing may be completed through a reduced number of stripping stages. That is, not only does the recovery percentage increases, but also stripping profile is improved. Bromine removal from the PLS is achieved by washing the PLS with a suitable water-immiscible organic solvent, typically at O:A ratio in the range from 1:1 to 2:1. The washing is preferably done with aliphatic hydrocarbon solvents consisting of long chains of carbon. To this end, petroleum distillates such as kerosene can be used with low levels of unsaturated hydrocarbons, e.g., aromatics. Commercially available examples include Cleansol 63L from Paz (Israel) or Shellsol D70 from Shell. Upon treating the bromine-loaded organic solvent with aqueous base solution, bromine is released from the organic solvent as an aqueous mixture of bromate ($BrO_3^-$) and bromide ($Br^-$). The resultant aqueous stream is sent to the regeneration step (55), to allow bromine recycling, as described in more detail below.

Alternatively, the elemental bromine content of the PLS may be removed by "air-stripping" by which method air is bubbled through the bromine containing solution and the resultant vapors are collected in a scrubber using a dilute solution of a base, e.g., sodium hydroxide (NaOH) as the recovery medium. The resultant scrub solution is an aqueous mixture of bromate and bromide (which is treated via electrolysis to regenerate elemental bromine as described below). Hence, in one embodiment of the invention, removal of elemental bromine from the pregnant leach solution before the extraction step is achieved by injecting air into the pregnant leach solution and collecting the vapors by way of a scrubber, with the scrubber solution being an alkaline solution.

The washed, essentially bromine-free PLS with the "correct pH" (less than 6.0) is subjected to solvent extraction (54). This step of the process consists in fact of two separate steps: extracting gold from the PLS with the aid of organic extractant to form gold-loaded extract and bromide-containing raffinate; and stripping the gold-loaded extract with a stripping agent to form gold-bearing aqueous solution.

The experimental results reported below show that the preferred extractant is an organophosphorous compound or an amine compound.

As an organophosphorous compound, an ester of pentavalent phosphorous acid, namely, an ester of phosphoric, phosphinic and phosphoric acids may be used. For example, alkyl phosphate ester, in particular a triester, that is, trialkyl phosphates such as tri n-butyl phosphate (TBP) may be used. Other suitable organophosphorous compounds are phosphines, either $OPR_3$ (phosphine oxides) or $SPR_3$ (phosphine sulfides) where R indicates an alkyl group (which may be the same or different), such as tri isobutyl phosphine oxide and tri isobutyl phosphine sulfide.

An amine extractant suitable for use in the present invention is tertiary amine (i.e., $NR_1R_2R_3$, wherein $R_1$, $R_2$ and $R_3$ are the same or different and are long alkyl groups, which may be either linear or branched groups, such as C7-C12 alkyl groups). Especially preferred is a tertiary amine comprising a mixture of trioctyl amine [$N(C_8H_{18})_3$] and tridecyl amine [$(N(C_{10}H_{22})_3$] which is commercially available as Alamine 336.

The extractant is added to a diluent which is a water-immiscible solvent such as those described above at a concentration from 10 to 50% v/v to form the diluted organic extraction medium operable in the invention. Solvent extraction may be conducted using conventional set-ups, that is, either a single stage configuration or with the aid of cross-current or countercurrent multistage solvent extraction vessels. At each stage, the organic and aqueous liquids are preferably combined at O:A ratio in the range from 5:1 to 1:5.

Next, gold is stripped from the organic extract with an alkaline solution. An alkaline environment is maintained in the stripping vessel, that is, pH of not less than 9, preferably not less than 10, and more preferably from 10 to 12 using a base solution as the strip agent, such as alkali hydroxide or alkali carbonate. The alkaline strip agent is a basic aqueous solution and additional amounts of a pH modifier are dosed at each stage. Stripping is achieved using the set-ups described above, where at each stage, the organic and aqueous liquids are preferably combined at O:A ratio in the range from 1:1 to 20:1, e.g., from 1:5 to 20:1.

The resultant gold-bearing aqueous solution contains mostly bromides and gold concentrated up to 20 times relative to the concentration of gold in the PLS. For example, if the extraction is done at 1:5 O:A and stripping is done at 4:1, the overall multiplication is 20. Elemental gold can then be recovered as explained in more detail below, and the gold-depleted solution can then be recycled to bromine regeneration.

Gold is recoverable from the solution using different methods, in particular adsorption, cementation of gold by zinc or gold electrowinning (56). In the latter method, the gold-bearing aqueous solution is transferred to, or circulated through, a suitable electrolytic cell optionally divided by a membrane to a cathode side and anode side. On industrial production, the electrodes may be spaced about 5-15 cm apart. The pH of the solution is from 7 to 13. Voltage of about 2.5-5.5 is applied; the $AuBr_4^-$ migrates to the cathode whereby gold plating is deposited onto the cathode surface. For successful electrowinning a cathode possessing high surface area is used. When the cathode is loaded, it is removed from the cell and treated to collect the gold. For example, a metal cathode may be dissolved in an acid; suitable metals include stainless steel or mild steel. A carbon cathode may be burned in a furnace, whereby gold is collected. A fresh cathode is then positioned in the cell.

After recovery of gold by solvent extraction from a pregnant leach solution generated by bromine leaching as described above, each of the aqueous bromide-containing solutions produced throughout the process, namely:

(i) the aqueous $Br^-/BrO_3^-$ stream formed upon absorbing into an alkaline solution elemental bromine from an organic solvent used for washing of the PLS (53), or the aforementioned scrub solution should the PLS be "air-stripped", where the concentrations of $Br^-$ and $BrO_3^-$ are from 15 to 45, and 5 to 15 g/l, respectively;

(ii) the raffinate stream generated in the solvent extraction step (54), with typical $Br^-$ concentration in the range from 5 to 20 g/l; and (iii) barren solution obtained following gold electrowinning (56), with $Br^-$ concentration from 1 to 5 g/l ($BrO_3^-$ may also be present in the barren solution, up to about 2 g/l);

may be delivered to a regeneration unit (55) to produce elemental bromine (55). That is, aqueous $Br^-$ streams or aqueous $Br^-/BrO_3^-$ streams are converted into a recyclable aqueous bromine stream to be directed to the leaching reactor. It should be noted that the solutions (i), (ii) and (iii) may be combined together prior to regeneration, or may treated separately, as dictated, for example, by the concentrations of bromide, to avoid undesired dilution effects. $Br^-/BrO_3^-$ stream preferably undergoes acidification prior to regeneration where $Br_2$ is formed from the reaction between $Br^-/BrO_3^-$, and remaining bromide will be oxidized as described below.

Hereinafter, to simplify the following description, these solutions are collectively named "the barren solution".

The recycling of the barren solution is preferably accomplished by oxidizing the bromide in an electrolytic cell (though chemical oxidation may be alternatively applied to recycle the barren solution). That is, one or more electrolytic cells are placed in the regeneration unit (55). Oxidation of bromide to bromine in an electrolysis cell is known in the art, and can be accomplished according to the conditions described for example in EP 476862 or WO 2004/087998.

Due to the fact that the bromide concentration in the stream submitted to electrolysis must be sufficiently high in order to enable effective bromine generation, barren solution with at least 5 g/l bromide should be used. An externally supplied bromide source (a concentrated aqueous bromide solution or bromide salt in a solid form) is injected into and mixed with the barren solution to produce a replenished barren solution which is suitable as feed to the electrolytic cell. More preferably, the concentration of bromide in the replenished barren solution is preferably not less than 10 g/l.

An alternative method of ensuring sufficient concentration of bromide feed to the regeneration step is to treat all or part of the barren solutions in order to concentrate them, e.g., with the aid of a suitable reverse osmosis membrane. Hence, one embodiment of the process comprises the steps of forcing the aqueous bromide-containing solution(s) to flow across a reverse osmosis membrane and delivering the concentrate obtained to the electrolytic cell(s).

Figure 5:
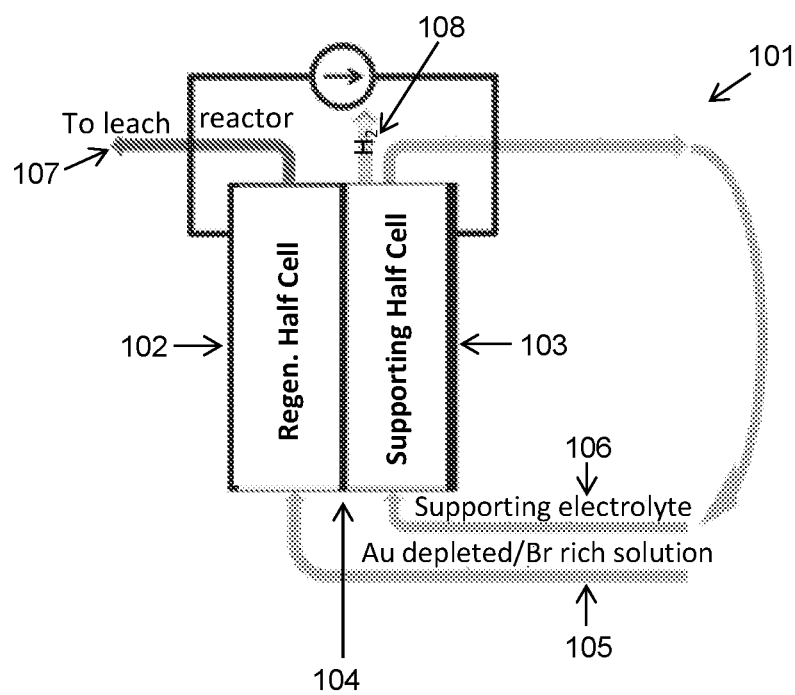

A structure of a single electrolytic cell (101) consisting of two half cells (102) and (103) is schematically shown in FIG. 5. The electrodes are preferably thin, flat rectangular plates, which are placed in parallel to each other and spaced about 3-7 mm apart (a laboratory set-up). Alternatively, a concentric arrangement of electrodes may be used. Each electrode provides about 10-20 cm$^2$ of surface area. For example, the dimensions of a rectangular electrode may be as follows: length of about 3-5 cm, width of about 3-4 cm and thickness of about 5 mm. The electrodes may be made of graphite, carbon, or suitable metals, including transition metal oxide-coated electrodes (e.g., $RuO_2$ and $IrO_2$ coated electrodes). When separator is placed in the space between the electrodes, then ion exchange membrane like Nafion® may be used, or microporous separator made of polyethylene. In the cell configuration shown in FIG. 5 a separator (104) is provided, dividing the cell into anode and cathode compartments. The electrolysis products are bromine (107) and hydrogen (108), generated at the anode and cathode compartments, respectively. However, a separator is not mandatory.

When the replenished barren solution (105) consists of an aqueous Br⁻ stream (essentially devoid of $BrO_3^-$), then it is caused to flow through the anode compartment simultaneously with the passage of an acidic supporting electrolyte (106) through the cathode compartment. The composition of the supporting electrolyte may be, for example sodium bromide with an added acid, and its pH may vary in the range from 3 to 6. The cell voltage is in the range from 2 to 5 V at a current density of 10 mA/cm$^2$-250 mA/cm$^2$. The rate of flow of the anolyte and catholyte solutions is from 30 to 700 ml/minute. The aqueous bromine stream produced (107) at the anode compartment is directed to the leaching reactor.

It should be understood that the single electrolytic cell shown in FIG. 5 may be one of a plurality of cells placed in an array of electrolysis modules that are hydraulically connected in series and electrically connected in parallel to a power source (e.g., a rectifier supplying direct current).

EXAMPLES

Methods

Bromine in aqueous phase was measured by titration with potassium iodide sodium thiosulphate solution and starch indicator. The chemistry of the titration is such that potassium iodide is oxidized to iodine in stoichiometric ratio with bromine. The resultant iodine is blue in the presence of starch. Thiosulfate reduces the iodine to iodide, with the end-point at the disappearance of the blue color.

Bromide in aqueous phase was measured by potentiometric titration with silver nitrate.

Bromate was measured using ion chromatography.

Gold in aqueous phase was measured by atomic absorption spectroscopy (AAS).

Examples 1 to 9

Leaching Gold from an Ore with the Aid of Aqueous $Br_2$/Br− Reagent

The experiments were carried out at ambient temperature in 500 ml jacketed glass reaction vessel hermetically sealed with FEP-Silicone O-Ring and a 5-neck reaction vessel lid (ChemGlass), equipped with a cooling condenser (to prevent bromine vapor escape), pH electrode for on-line measurements and Reference Redox electrode for ORP (oxidation reduction potential) measurements.

The general procedure used in experiments reported below consists of the following steps. $Br_2$/Br aqueous leaching solution is introduced into the reaction vessel. The concentration of elemental bromine and sodium bromide in the aqueous solution is 5 g/l and 5 g/l, respectively. The homogenized ground ore [Roaster calcine, 80% of the particles less than 75 micron)] is added to the solution. The weight ratio liquid:solid is 2:1. The reaction slurry is stirred by means of a mechanical Teflon coated stirrer rotating at a range of 300 rpm. On completion, the reaction slurry was filtered using closed 500 mL filter funnel with a 90 mm Microfiber Glass filter, to obtain the PLS.

The filter cake was washed and vacuum filtered through the same filter paper with a fresh leach solution. The filter cake was washed a second time with water, dried at 110° C. and sent for gold analyses by fire assay (F.A.). The first filtrate was combined with the PLS.

The effect of two variables was investigated separately in the set of experiments reported below: leach time and pH of the reaction mixture. In Examples 1 to 4, the experiments were run under the resulting natural pH of the slurried material in the leach solution, with leach time being varied in the range from 2 minutes to 30 minutes. The experimental conditions and results are set out in Table 1.

TABLE 1

| Example | Leach time (min) | pH | ORP (mV) | Au recovery (%) |
|---|---|---|---|---|
| 1 | 2 | 8.0 | 910 | 82 |
| 2 | 12 | 7.9 | 910 | 84 |
| 3 | 15 | 7.9 | 910 | 86 |
| 4 | 30 | 7.9 | 910 | 86 |

In Examples 5 to 9, the leach time was constant (15 minutes), but the pH of the reaction mixture was adjusted within the acidic and basic ranges, with the aid of $H_2SO_4$ (10% w/w solution) and NaOH (10% w/w solution), respectively. The experimental conditions and results are set out in Table 2.

TABLE 2

| Example | Leach time (min) | pH | ORP (mV) | Au recovery (%) |
|---|---|---|---|---|
| 5 | 15 | 3.0 | 903 | 70 |
| 6 | 15 | 6.0 | 910 | 79 |
| 7 | 15 | 7.9 (natural) | 910 | 86 |
| 8 | 15 | 8.0 | 870 | 84 |
| 9 | 15 | 10.0 | 770 | 74 |

The results shown in Tables 1 and 2 indicate that leaching of gold from the ore could be achieved at a fairly short period of time under the natural pH of the slurried material. In fact, longer leach times may even lead to inferior results.

Example 10 (Comparative) and 11-12 (of the Invention)

Leaching Gold from an Ore with the Aid of Aqueous $Br_2/Br-$ Reagent Followed by Different Washings of the Filter Cake A set of leaching experiments were run according to the general procedure outlined above. Roaster calcine ore was used, with [20 g/l $Br_2$+20 g/l Br-] as the leaching reagent at liquid:solid ratio of 2:1. Following the solid/liquid filtration, the filter cake was washed twice as described above, and the filtrates were collected and combined. In Example 10, the wash liquid was water; in Examples 11 and 12, a fresh leach solution was used to wash the filter cake. The experimental conditions and results are tabulated in Table 3; Au percentage recovery reported includes the contribution of the filtrates collected.

TABLE 3

| Example | pH | time | Wash liquid | Au recovery (%) |
|---|---|---|---|---|
| 10 | 7.48 | 15 | water | 80.6 |
| 11 | 6.90 | 15 | Fresh $Br_2$/Br- reagent (20 g/l Br2, 20 g/l Br-) | 91.0 |
| 12 | 7.48 | 15 | Fresh $Br_2$/Br- reagent (20 g/l Br2, 20 g/l Br-) | 89.5 |

It is seen that Au percentage recovery increases as a result of washing of the gold-depleted solid cake with the $Br_2$/Br- reagent of the invention.

Examples 13 to 23

Extraction of Gold from $Br_2$/Br- Pregnant Leach Solution with Various Extractants A test for the suitability of different organic compounds for extracting gold from aqueous solutions was made by preparing gold solutions (NaAuBr$_4$) in deionized (DI) water, or adding such gold solutions to bromine/bromide solutions, and then vigorously shaking the tested aqueous solution with the organic liquid extractant at O:A ratio of 1:1 for three minutes at a separating funnel and allowing the mixture to stand. In the qualitative test, phases' clarity and separability were observed and in the quantitative test, percentage of extraction was determined by measuring gold in the aqueous raffinate. The experimental conditions (e.g., the composition of the test solution and organic extractant used) and results are tabulated in Table 4.

TABLE 4

| Ex. | Extractant | PLS pH | [Au] ppm | [Br2] gpL | Br- gpL | Ext % Rec | Observation |
|---|---|---|---|---|---|---|---|
| 13A | 10% Tripropyl- | 2.1 | 2.9 | 0 | 0 | 71 | Pink raffinate |
| 13B | ene glycol n-butyl Ether (Dowanol) | 1.6 | 9.5 | 0 | 0 | 88 | Blue/grey precipitate pink raffinate |
| 14A | Ester alcohol | 3.7 | 3.0 | 0 | 0 | 98 | black precipitate |
| 14B | (Texanol) | 3.1 | 10.7 | 0 | 0 | 100 | black precipitate |
| 14C | | 4.7 | 3.7 | 0 | 0 | 65 | Clear, heated for phase separation |
| 15A | Tri n-butyl | 3.7 | 3.0 | 0 | 0 | 98 | Clear phases |
| 15B | phosphate | 3.2 | 10.7 | 0 | 0 | 100 | Clear phases |
| 16 | Trialkyl phosphine oxide (Cyanex 923) | 4.2 | 3.3 | 0 | 0 | 98 | Clear phases |
| 17A | Guanadine (LIX 79) | 3.8 | 3.3 | 0 | 0 | 49 | Clear, heated for phase separation |
| 17B | | 3.3 | 10.7 | 0 | 0 | 36 | Aqueous phase turbid, heated for phase separation |
| 18 | Quaternary amine & nonyl phenol (LIX 7820) | 4.3 | 3.7 | 0 | 0 | 49 | Aq. Phase turbid. Clear, no ppte, heated for phase sep. Persistent white emulsion |
| 19 | Tri-octyl/ dodecyl amine (Alamine 336) | 4.3 | 3.7 | 0 | 0 | 99 | Clear phases |
| 20 | Acetic acid n-amyl ester | 3.5 | 3.0 | 30 | 3 | 88 | Odourous, clear phases |
| 21 | Diethylene glycol di butyl ether | 3.5 | 3.0 | 30 | 3 | 80 | Odourous, clear phases |
| 22 | Diethylene glycol di methyl ether | 3.5 | 3.0 | 30 | 3 | n.d. | Phases completely miscible |
| 23A | Tri isobutyl | 6.0 | 3.4 | 0 | 0 | 98 | Clear phases |
| 23B | phosphine | 0.6 | 5.5 | 33.7 | 1.8 | 99 | Clear phases |
| 23C | sulfide | 3.4 | 5.2 | 31.1 | 1.0 | 99 | Clear phases |

The results presented in Table 4 indicate that phosphorous and amine compounds can be used to extract gold from aqueous solutions. In all subsequent experiments reported below, tri n-butyl phosphate was employed.

Examples 24-44

Extracting Gold from $Br_2$/Br- Pregnant Leach Solution with the Aid of Tri n-Butyl Phosphate In the following set of experiments, tri n-butyl phosphate in a low aromatic diluent (Cleansol 63L) was used to extract gold from various gold bromide (AuBr$_4^-$)—containing aqueous solutions. The concentration of the tri n-butyl phosphate extractant in the organic solution varied in the range from 5% to 50% (v/v).

In Examples 24 to 26, the aqueous solutions were prepared by adding sodium aurobromide (NaAuBr$_4$) to distilled water. Therefore, these solutions are devoid of elemental bromine and bromide. The concentration of AuBr$_4$ in the solutions is set out in Table 5.

In Examples 27 to 36, the aqueous solutions were prepared by combining sodium bromide (NaBr), hydrobromic acid (HBr) and commercial hydrogen peroxide ($H_2O_2$) in a closed vessel (whereby elemental bromine is generated in situ due to the oxidation of bromide with $H_2O_2$) followed by the addition of aurobromide ($NaAuBr_4$). In this way, $AuBr_4^-$, $Br_2$ and bromide-containing aqueous solutions were formed, having the compositions tabulated in Table 5.

In Examples 37 to 44, aqueous solutions consisting of actual PLS generated by leaching of an oxide ore under the conditions set out in Examples 1-9 were used. Therefore, these solutions contain $AuBr_4^-$, $Br_2$ and bromide; the exact compositions are set out in Table 5.

All tests were carried out at by combining the organic solution and the aqueous solution at O:A ratio of 1:1. The phases were shaken vigorously for 3 minutes in a separating funnel and allowed to separate before sampling. The exact experimental conditions are found in Table 5. The concentrations of the various species were measured in the raffinate and are presented in Table 5.

TABLE 5

| Ex. | % extract-ant | O:A RA-TIO | pH | PLS [Au] mg/L | [Br−] g/L | [Br2] g/L | RAFFINATE [Au] mg/L | [Br−] g/L | [Br2] g/L |
|---|---|---|---|---|---|---|---|---|---|
| 24 | 50 | 1:1 | 3.7 | 3.0 | 0 | 0 | <0.05 | 0 | 0 |
| 25 | 50 | 1:1 | 3.2 | 10.0 | 0 | 0 | <0.05 | 0 | 0 |
| 26 | 50 | 1:1 | 2.4 | 110.5 | 0 | 0 | 0.295 | 0 | 0 |
| 27 | 25 | 1:1 | 4.4 | 3.3 | ~30 | n.m | <0.1 | ~30 | 3.7 |
| 28 | 25 | 1:1 | 3.5 | 4.7 | 28.8 | ~2.5 | <0.1 | 28.6 | n.m |
| 29 | 20 | 1:1 | 3.5 | 4.7 | 28.8 | ~2.5 | <0.1 | 29.2 | n.m |
| 30 | 15 | 1:1 | 3.5 | 4.7 | 28.8 | ~2.5 | <0.1 | 28.9 | n.m |
| 31 | 10 | 1:1 | 3.5 | 4.7 | 28.8 | ~2.5 | 0.6 | 29.0 | n.m |
| 32 | 5 | 1:1 | 3.5 | 4.7 | 28.8 | ~2.5 | 3.1 | 29.0 | n.m |
| 33 | 25 | 1:1 | 1.4 | 3.3 | ~30 | 6.8 | <0.1 | ~30 | 1.4 |
| 34 | 25 | 1:1 | 1.1 | 4.4 | 22.4 | 8.2 | <0.1 | 19.9 | 1.1 |
| 35 | 25 | 1:1 | 3.6 | 4.1 | 21.7 | 0.6 | <0.1 | 21.3 | 3.1 |
| 36 | 25 | 1:1 | 3.7 | 5.8 | 22.6 | 21.0 | 0.15 | 18.7 | 0.6 |
| 37 | 25 | 1:1 | 8.5 | 3.9 | 8.9 | 0.3 | 3.1 | 9.0 | 0.1 |
| 38 | 25 | 1:1 | 7.4 | 3.1 | 8.7 | 0.5 | 0.3 | 8.5 | <0.1 |
| 39 | 25 | 1:1 | 1.6 | 1.8 | 9.7 | 1.6 | <0.1 | 7.5 | 0.3 |
| 40 | 25 | 1:1 | 4.0 | 2.0 | 6.7 | 1.1 | <0.1 | 6.6 | 0 |
| 41 | 25 | 1:1 | 6.0 | 1.9 | 6.8 | 1.2 | <0.1 | 6.6 | 0 |
| 42 | 25 | 1:1 | 7.2 | 1.9 | 6.5 | 1.3 | <0.1 | 6.4 | 0.1 |
| 43 | 25 | 1:1 | 8.1 | 1.9 | 7.0 | 0.7 | 1.0 | 7.3 | 0.3 |
| 44 | 25 | 1:1 | 10.6 | 1.9 | 6.8 | 0.8 | 2.0 | 6.9 | 0.9 |

The results shown in Table 5 indicate that bromine/bromide ($Br_2/Br^-$) gold solutions could be readily extracted with an organo phosphorous extractant dissolved in an organic solvent at a concentration in the range from 15% to 50% (v/v).

Examples 45 to 57

Extracting Gold from $Br_2/Br-$ Pregnant Leach Solution with the Aid of Tri n-Butyl Phosphate and Stripping Gold from the Organic Extract In the next set of Examples, extraction experiments were run according to the general procedure described in the previous set of Examples, to extract gold from pregnant leach solution and obtain gold-bearing organic extract. Extraction experiments were carried out at by combining the extraction medium, consisting of tri n-butyl phosphate dissolved in Cleansol 63L at 25% (v/v), and the aqueous PLS at O:A ratio of 1:1. The composition of the PLS and the aqueous raffinate are set forth in Table 6, indicating that extraction was successfully achieved.

Next, various reagents were tested under different conditions to recover the gold from the gold-bearing organic extract. The reagents which were considered for this purpose include hot and cold deionized (DI) water; sodium sulfite ($Na_2SO_3$) solution at a concentration of 1 g/liter; $Na_2SO_3$ solution at a concentration of 1 g/liter acidified with sulfuric acid; $Na_2SO_3$ solution at a concentration of 1 g/liter basified with dilute sodium hydroxide; 1M sodium hydroxide solution; ambient DI water with continuous adjustment to pH>10 by adding either dilute solutions of sodium hydroxide (1M) or sodium carbonate solution (20 g $Na_2CO_3$ per liter). All stripping experiments were carried out at O:A ratio of 1:1, either by shaking the phases vigorously in separating funnels and allowing the phases to separate before sampling (Examples 45-55), or in stirred beakers (Examples 56-57). A summary of stripping experiments is shown in Table 6.

TABLE 6

| Ex. | PLS pH | [Au] mg/l | [Br−] g/l | [Br2] g/l | Raffinate pH | [Au] mg/l | [Br−] g/l | [Br2] g/l | Stripping: Reagent Temperature | Strip solution pH | [Au] mg/l | [Br−] g/l | [Br2] g/l |
|---|---|---|---|---|---|---|---|---|---|---|---|---|---|
| 45 | | | | | | | | | | | | | |
| 46 | 4.2 | 3.7 | 0 | 0 | 3.0 | 0.6 | 0 | 0 | DI water 40° C. | 5.8 | <0.5 | 0 | 0 |
| 47 | 4.2 | 3.7 | 0 | 0 | 3.0 | 0.6 | 0 | 0 | 1 g/l $Na_2SO_3$ 40° C. | 8.1 | 2.8 | 0 | 0 |
| 48 | 1.4 | 3.3 | ~30 | 6.8 | 1.4 | <0.2 | ~33 | 2.9 | 1 g/l $Na_2SO_3$ ambient | 8.8 | 0 | nm | 0.5 |
| 49 | 4.4 | 3.3 | ~30 | 6.8 | 3.7 | <0.2 | ~33 | 1.1 | 1 g/l $Na_2SO_3$ ambient | 8.8 | 2.9 | nm | 0 |
| 50 | 0.8 | 5.2 | 34.0 | 5.1 | 1.0 | <0.1 | 32.3 | 3.2 | 1 g/l $Na_2SO_3$ ambient | 1.7 | <0.1 | 2.1 | 0 |
| 51 | 0.8 | 5.5 | 34.0 | 26.4 | 0.9 | <0.1 | 32.7 | 26.4 | 1 g/l $Na_2SO_3$ ambient | 2.2 | <0.1 | 0.8 | 0 |
| 52 | 4.3 | 3.5 | 31.4 | 8.5 | 3.0 | <0.1 | 31.1 | nm | 1 g/l $Na_2SO_3$ ambient | 2.0 | 0.2 | 1.1 | nm |
| 53 | 4.3 | 3.5 | 31.4 | 8.5 | 3.0 | <0.1 | 31.1 | nm | 1 g/l $Na_2SO_3$ acidified with H2SO4 ambient | 1.6 | <0.1 | 1 | nm |
| 54 | 4.3 | 3.5 | 31.4 | 8.5 | 3.0 | <0.1 | 31.1 | nm | 1 g/l $Na_2SO_3$ basified with NaOH ambient | 11 | 0.6 | 1 | nm |

TABLE 6-continued

| | PLS | | | Raffinate | | | Stripping: | Strip solution | | | |
|---|---|---|---|---|---|---|---|---|---|---|---|
| Ex. 45 | pH | [Au] mg/l | [Br−] g/l | [Br2] g/l | pH | [Au] mg/l | [Br−] g/l | [Br2] g/l | Reagent Temperature | pH | [Au] mg/l | [Br−] g/l | [Br2] g/l |
| 55 | 3.5 | 4.8 | 30 | 1.2 | 3 | 0.2 | 29.6 | 0.2 | 1M NaOH ambient | <13 | 2.9 | 0.4 | 0.5 |
| 56 | 3.5 | 4.8 | 30 | 1.2 | 3 | 0.2 | 29.6 | 0.2 | DI, pH kept at 10 with 1M NaOH ambient | ~10 | 3.1 | 2.6 | nm |
| 57 | 3.7 | 4.4 | 33.9 | nm | 3.6 | <0.1 | 29.7 | 2.2 | DI, pH kept at 10 with Na$_2$CO$_3$ ambient | ~10 | 4.4 | 2.3 | nm |

It is seen from the results in Table 6 that stripping of gold from the gold-loaded organic phase is achieved with the aid of aqueous base, preferably at pH above 10.

Examples 58-61

Extracting Gold from a Washed Pregnant Leach Solution with the Aid of Tri n-Butyl Phosphate and Stripping Gold from the Organic Extract In the next set of Examples, the effect of pre-washing of a pregnant leach solution with an organic solvent to remove bromine from the PLS prior to gold recovery was studied. The PLS samples were produced by leaching of ore samples from a gold mine in the USA, using a leach solution having concentration of 5 g/l Br$_2$ and 5 g/l Br$^-$ according to the experimental procedure described above, followed by the following steps:

Acidification: the PLS tested was acidified with HBr (10% solution) to pH=5.7 (this is because the natural pH was ~6.8). Washing: the acidified PLS and the organic solvent (Cleansol) used for bromine removal were vigorously shaken at O:A ratio of 1:1 for three minutes in a separating funnel, following which the aqueous and organic phases were separated. Bromine is removed from PLS and loaded onto the Cleansol; loaded Cleansol is stripped at 20:1 with 4% NaOH to recover the bromine in the form of bromate and bromide in liquor solution. Extraction: gold was then extracted from the PLS into tri n-butyl phosphate dissolved in Cleansol (25% v/v) according to the general procedure illustrated in previous examples, at O:A ratio of 1:5, and the gold content of the raffinate was measured.

Stripping: the gold-loaded organic extract was then subjected to stripping through five stages in a cross-current fashion. The strip solution in each stage consists of fresh DI water (pH adjusted to <10 with NaOH 4.2% added to maintain pH above in all stripping stages). In each of the five stripping stages the O:A ratio was 20:1, which is combined to give 4:1.

It should be noted that Example 58 is a reference Example, with no washing taking place in the experiment. In Examples 59 and 60, one cycle of washing was done whereas in Example 61, the washing was repeated two times.

Table 7 shows the results of the washing step, that is, bromine concentration (g/l) in the PLS before and after Cleansol wash (different batches of PLS were used, which account for the different bromine content in the PLS).

TABLE 7

| | 58 | 59 | 60 | 61 |
|---|---|---|---|---|
| PLS | 1.16 | 0.56 | 1.08 | 0.66 |
| Washed PLS | | 0.16 | 0.24 | 0.10 |

Table 8 shows the gold concentration measured in the four PLS samples prior to extraction (ppm), gold concentration in the raffinate following extraction (ppm), and gold concentration in each the gold-bearing aqueous solution generated in each of the stripping stages (ppm).

TABLE 8

| Example | 58 | 59 | 60 | 61 |
|---|---|---|---|---|
| Gold concentration (ppm) in PLS (before extraction) | | | | |
| PLS | 2.4 | 1.94 | 2.04 | 1.27 |
| Gold concentration (ppm) in raffinate generated after extraction | | | | |
| Raffinate | >0.1 | >0.1 | >0.1 | >0.1 |
| Gold concentration (ppm) in strip solutions after each stage | | | | |
| Stripping Stage 1 | 9.2 | 55.50 | 11.60 | 78.50 |
| Stripping Stage 2 | 30 | 111.00 | 102.00 | 55.50 |
| Stripping Stage 3 | 47.8 | 21.90 | 73.00 | 8.00 |
| Stripping Stage 4 | 72.5 | 2.05 | 23.20 | 0.55 |
| Stripping Stage 5 | 48.2 | 0.22 | 6.10 | 0.00 |
| Strip recovery (%) | | | | |
| | 86.5 | 98.3 | 100 | 100 |

It is seen that in Examples 59-61, where Cleansol wash was applied, the major portion of gold was stripped in stages 1-3 and overall recovery was close to 100%, whereas in Example 58, devoid of Cleansol wash, the major portion of gold was stripped in stages 3-5 and the recovery was ~86%.

Example 62

Gold Electro-Winning

Figure 4:
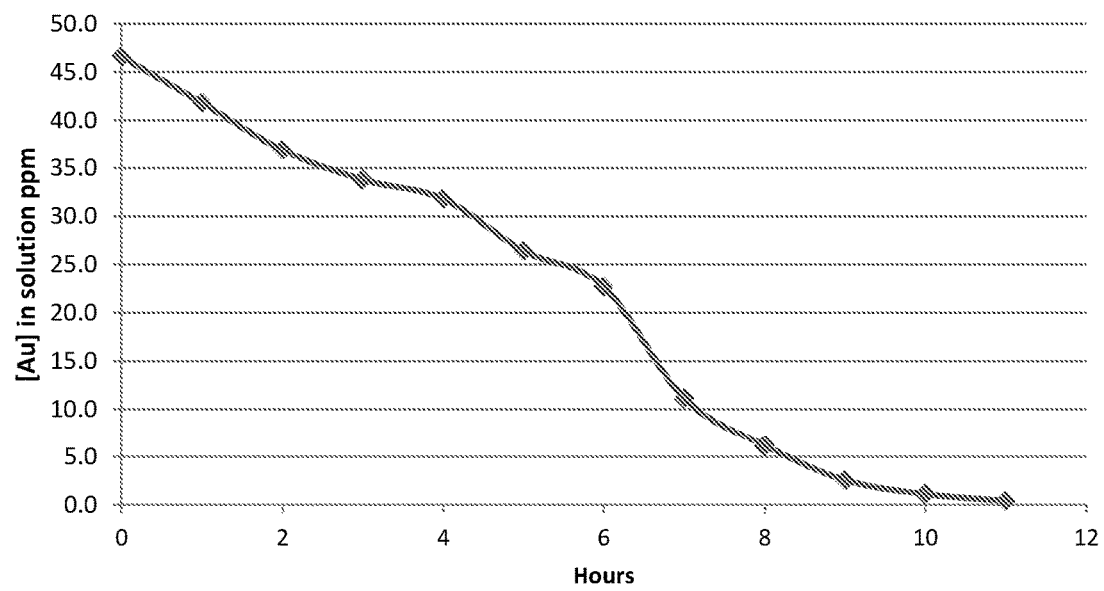

A simulated strip solution at approximately 50 ppm Au concentration was used for this experiment. A primitive cell was constructed with a stainless steel wool (kitchen scrubby) cathode contained in a membrane chamber and lead anodes. A rectifier supplied 4 V. The current slowly fell from 1.4 A to 0.6 amps. Solution was continuously recycled to the cell for a total of 12 hours. From FIG. 4 it can be seen that the solution was depleted in 12 hours. About half of the physical gold was recovered by vigorous water washing of the cathode and the remainder by complete digestion of the steel wool by hydrochloric acid. Both residues were digested in aqua-regia for analysis and the gold accounted for.

Examples 63-65

Electrochemical Oxidation of Bromide to Generate Bromine

The experimental set-up used consists of a flow cell. Graphite electrodes with active area of 10 cm$^2$ were used. The half cells are separated by a membrane (polyethylene) that prevents the migration of bromine from the anode compartment to the cathode compartment (in the cathode compartment, hydrogen evolves while bromine is generated in the anode compartment). Each of the catholyte and anolyte solutions consists of 150 mL of bromide-containing aqueous solution (sodium bromide). The solutions are caused to circulate with the aid of peristaltic pump producing a rate of flow of 210 ml/minute.

In Example 63, the initial concentration of bromide in each of the circulated solutions was 10% by weight. For bromine generation, the mode of operation of the cell was set to galvanostatic with 90 mA/cm$^2$ of current flowing through the cell with a potential limit of 4.9 V. pH was kept at 4 by titrating HCl (20% solution) into the cathode compartment. After 3.56 hours, the concentration of bromine measured at the anodic side was 5.56 w/w.

In Example 64, the initial concentration of bromide in each of the circulated solutions was 3.84% by weight. For bromine generation, the mode of operation of the cell was set to galvanostatic with 50 mA/cm$^2$ of current flowing through the cell with a potential limit of 4.9 V. pH was kept at 6 by titrating HBr (52% solution) into the cathode compartment. After 3.0 hours, the concentration of bromine measured at the anodic side was 2.06 w/w.

In Example 65, the initial concentration of bromide in each of the circulated solutions was 2.3% by weight. In addition, the solutions contain 4.1% by weight bromate. The pH of the solutions is 13.31. For bromine generation, the mode of operation of the cell was set to potentiostatic at 5.0 V applied to the cell. pH was not controlled. After 3.0 hours, the experiment was terminated and following acidification, the bromine concentration measured at the anodic side was 5.73 w/w. The experimental conditions and results are tabulated in Table 9.

TABLE 9

| Ex | Initial Bromide Conc. (w %) | pH | pH control | Current density | Final Bromine conc. (w %) |
|---|---|---|---|---|---|
| 63 | 10.0 w % Br$^-$ | 4 | Yes; with HCl | 90 mA/cm$^2$ | 5.6 w % |
| 64 | 3.8 w % Br$^-$ | 6 | Yes; with HBr | 50 mA/cm$^2$ | 2.1 w % |
| 65 | 2.3 w % Br$^-$ + 4.1 w % Bromate | 13.3 | No | 5 mA/cm$^2$ | 5.7 w % |

The invention claimed is:

1. A process for recovering gold from a gold-containing raw material, comprising leaching the gold-containing material with an aqueous solution comprising elemental bromine and bromide source to form a pregnant leach solution with the gold dissolved therein and a gold-depleted raw material; separating said pregnant leach solution from the gold-depleted raw material, removing elemental bromine from said pregnant leach solution, extracting the gold from the pregnant leach solution in an acidic environment into an organic extractant, to form a gold-loaded extract and bromide-containing raffinate, stripping the extract with an alkaline aqueous solution to form a gold-bearing aqueous solution, generating gold and treating one or more bromide-containing streams to produce recyclable elemental bromine.

2. The process according to claim 1, wherein the gold-containing raw material is an ore which generates a pH of 6.0 to 8.0 when added to water, such that the leaching takes place at a pH in the range from 6.0 to 8.0.

3. The process according to claim 1, wherein after the separation of the leach solution from the gold-depleted raw material, the process further comprises a step of washing the solid gold-depleted raw material with an aqueous Br$_2$/Br$^-$ reagent, separating the solid from the aqueous washing liquid to obtain an aqueous solution with gold constituent, and combining the aqueous solution with gold constituent with the pregnant leach solution.

4. The process according to claim 2, wherein before the extraction step, the process further comprises lowering the pH of the pregnant leach solution to below 6.0 with an addition of a mineral acid.

5. The process according to claim 1, wherein the removal of elemental bromine from the pregnant leach solution before the extraction step is achieved by washing said pregnant leach solution with a water immiscible organic solvent, to obtain bromine-loaded organic solvent.

6. The process according to claim 5, wherein the pregnant leach solution is washed with a water immiscible organic solvent comprising aliphatic hydrocarbon.

7. The process according to claim 5, wherein bromine is released from the bromine-loaded organic solvent by treating the bromine-loaded organic solvent with an aqueous base solution, to obtain an aqueous mixture of BrO$_3^-$ and Br$^-$.

8. The process according to claim 1, wherein the removal of elemental bromine from the pregnant leach solution before the extraction step is achieved by injecting air into the pregnant leach solution and collecting vapor by way of a scrubber with an alkaline solution.

9. The process according to claim 1, wherein the step of extracting the gold from the pregnant leach solution is achieved with an organic extractant selected from the group consisting of organophosphorous compounds and amine compounds.

10. The process according to claim 9, wherein the organophosphorous compound is alkyl phosphate ester.

11. The process according to claim 10, wherein the alkyl phosphate ester is tri n-butyl phosphate.

12. The process according to claim 1, wherein the step of stripping the extract with an alkaline aqueous solution is carried out while maintaining in a stripping vessel an alkaline environment with pH of not less than 9.

13. The process according to claim 12, wherein the alkaline aqueous solution comprises alkali hydroxide or alkali carbonate.

14. The process according to claim 1, wherein gold is recovered from the gold-bearing aqueous solution by electrowinning.

15. The process according to claim 1, wherein each of the aqueous bromide containing solutions produced throughout the process is delivered to a regeneration unit comprising one or more electrolytic cells, to produce elemental bromine.

16. The process according to claim 15, comprising forcing the aqueous bromide containing solutions to flow across a reverse osmosis membrane and delivering a concentrate obtained to the one or more electrolytic cells.

17. The process according to claim 1, wherein the gold-containing raw material is selected from the group consisting of oxidized ore, oxidized concentrate and oxide ore.

* * * * *